US 6,727,298 B2

(12) United States Patent
Witt et al.

(10) Patent No.: US 6,727,298 B2
(45) Date of Patent: Apr. 27, 2004

(54) METHOD FOR REDUCING THE PERMEABILITY OF FILMS OR COATINGS TO WATER VAPOR

(75) Inventors: Uwe Witt, Mutterstadt (DE); Gabriel Skupin, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/204,969

(22) PCT Filed: Mar. 6, 2001

(86) PCT No.: PCT/EP01/02491

§ 371 (c)(1),
(2), (4) Date: Aug. 27, 2002

(87) PCT Pub. No.: WO01/66630

PCT Pub. Date: Sep. 13, 2001

(65) Prior Publication Data

US 2003/0060542 A1 Mar. 27, 2003

(30) Foreign Application Priority Data

Mar. 8, 2000 (DE) .......................................... 100 10 826

(51) Int. Cl.[7] .......................... C08K 11/00; C08L 91/06
(52) U.S. Cl. .......................... 524/35; 524/47; 524/78; 524/277
(58) Field of Search .......................... 524/35, 47, 78, 524/277

(56) References Cited

U.S. PATENT DOCUMENTS

| 2,292,393 A | 8/1942 | Mitchell |
| 5,500,465 A | 3/1996 | Krishnan et al. |
| 5,844,023 A | 12/1998 | Tomka |
| 6,018,004 A | 1/2000 | Warzelhan et al. |
| 6,120,895 A | 9/2000 | Kowitz et al. |
| 6,201,034 B1 | 3/2001 | Warzelhan et al. |
| 6,214,907 B1 | 4/2001 | Tomka |

FOREIGN PATENT DOCUMENTS

| EP | 529 396 | 3/1993 |
| EP | 616 569 | 9/1994 |
| NL | 1006548 | 1/1999 |
| WO | 93/11937 | 6/1993 |
| WO | 94/0354 | 2/1994 |
| WO | 94/12157 | 6/1994 |
| WO | 98/14326 | 4/1998 |
| WO | 98/20073 | 5/1998 |

OTHER PUBLICATIONS

Patent Abst.Japan, vol. 017, No. 154 (1993), 04318074.

*Primary Examiner*—Kriellion A. Sanders
(74) *Attorney, Agent, or Firm*—Keil & Weinkauf

(57) ABSTRACT

A process for reducing the water-vapor permeability of films or coatings made from polymer compositions (Q) comprising beeswax or comprising montan ester wax or comprising mixtures of these, by preparing a composition (Z) comprising $Z_1$) from 40 to 98.5% by weight of at least one polymer compatible with the polymer (Q1) which is the basis of Q, $Z_2$) from 0.5 to 20% by weight of starch or cellulose or a mixture of these as compatibilizer, $Z_3$) from 1 to 20% by weight of beeswax or montan ester wax or a mixture of these, and $Z_4$) from 0 to 20% by weight of at least one additive, where the percentages by weight are based on the total weight of Z, and in a second step combining the composition Z with the polymer (Q1) which is the basis of Q.

5 Claims, No Drawings

METHOD FOR REDUCING THE PERMEABILITY OF FILMS OR COATINGS TO WATER VAPOR

The present invention relates to a process for reducing the water-vapor permeability of films or coatings made from polymer compositions (Q) comprising beeswax or comprising montan ester wax or comprising mixtures of these. The present invention further relates to films or coatings made from polymer compositions (Q) comprising beeswax or comprising montan ester wax or comprising mixtures of these. The present invention further relates to compositions which comprise $Z_1$) from 40 to 98.5% by weight of at least one partly aromatic polyester, $Z_2$) from 0.5 to 20% by weight of starch, cellulose or mixtures of these, $Z_3$) from 1 to 20% by weight of beeswax or montan ester wax or mixtures of these, and $Z_4$) from 0 to 20% by weight of at least one additive, and also to the use of these as premixes and for reducing water-vapor permeability.

Polymer compositions for producing films or coatings are known per se. Many films or coatings are not sufficiently impermeable to water-vapor for many purposes, such as use in the food and drink sector. It is also known that straight polymer compositions do not generally comply with all of the technological requirements. They become economically and technologically useful only when additives have been added. Since the amounts of additives needed in the polymer compositions are mostly only small, and the incorporation and homogeneous distribution of such small amounts of additives is often technically difficult, the form in which the additives are mostly added to the polymer compositions is that of a premix, known as a masterbatch, in which they are present at relatively high concentration.

If lubricants, such as waxes, are used as additives, a problem in practice is that the lubricants are often difficult to mix into the polymer matrix, but agglomerate in the matrix and remain at its surface. This leads firstly to deposits of lubricant on the walls of the mixing unit used, e.g. of the extruder. Secondly, because of the external lubrication it then becomes difficult to mix in any additives which are to be added subsequently. This behavior of the lubricants causes particular problems during the preparation of masterbatches, since the premixes are difficult to prepare with the necessary high wax and additive concentrations.

Compositions based on biodegradable polymers, starch or cellulose and on waxes are known (DE-A1 44 40 858).

For example, WO 98/14326 discloses compositions which may comprise polyesters, such as polyhydroxyalkanoates, and from 2 to 30 parts by weight of wax as additive, based on 100 parts by weight of the composition. It is also generally disclosed that the compositions may also comprise fibrous or lamellar fillers or reinforcing materials.

There are also known biodegradable laminates which comprise a waxy layer which has been built up from a wax as principal component and from a polymer, such as polyvinyl alcohol, or from an acetate or acrylate. This waxy layer may also comprise thickeners, e.g. starch, methylcellulose or hydroxymethylcellulose (EP-B1 616 569).

WO 98/20073 concerns starch-containing compositions based on biodegradable polymers, for example on aliphatic-aromatic copolyesters. These comprise, as compatibilizers between the polymeric matrix and the filler dispersed therein, esterified polyols, i.e. fats or oils in amounts of from 0.5 to 20% by weight. Examples of the amounts of starch are from 20 to 95% by weight, preferably from 30 to 75% by weight. Waxes are mentioned as additives.

WO 94/3543 discloses biodegradable compositions in which the flow improvers present may comprise, inter alia, 5 to 70% by weight of polyolefin waxes, based on the total weight of the respective composition. According to this publication, the flow improvers are particularly valuable for preparing compositions with high filler contents. Compositions whose mechanical properties are studied by way of example are based on polyethylene-vinyl alcohol, polyethylene-acrylic acid, 40 or 25% of wood flour and 7 or, respectively, 5% of polyethylene wax.

It is an object of the present invention to find a process for reducing the water-vapor permeability of films or coatings. In particular, the process provided should give films or coatings which are environmentally compatible. A further object is to find films or coatings which have reduced water-vapor permeability and can be used in the food and drink sector. Finally, the films or coatings provided should have a good surface.

We have found that this object is achieved by using beeswax or montan ester wax or mixtures of these in polymer compositions to reduce the water-vapor permeability of coatings or films produced therefrom. Surprisingly, it has also been found that starches or celluloses are suitable as compatibilizers for binding beeswax or montan ester wax, or a mixture of these, into a polymer matrix, and the object set is therefore achieved by means of a process for reducing the water-vapor permeability of films or coatings made from polymer compositions (Q) comprising beeswax or comprising montan ester wax or comprising mixtures of these, by in a first step preparing a composition (Z) comprising $Z_1$) from 40 to 98.5% by weight of at least one polymer compatible with the polymers (Q1) which are the basis of Q, $Z_2$) from 0.5 to 20% by weight of starch or cellulose or a mixture of these as compatibilizer, $Z_3$) from 1 to 20% by weight of beeswax or montan ester wax or a mixture of these, and $Z_4$) from 0 to 20% by weight of at least one additive, where the percentages by weight are based on the total weight of Z, and in a second step combining the composition Z with the polymer Q1 which is the basis of Q.

Preferred compositions Z which may be used according to the invention as premixes comprise from 60 to 97% by weight of $Z_1$, from 1 to 15% by weight of $Z_2$, from 2 to 15% by weight of $Z_3$, and from 0 to 10% by weight of $Z_4$. In another preferred embodiment, the compositions Z comprise from 70 to 95.9% by weight of $Z_1$, from 1 to 10% by weight of $Z_2$, from 3 to 10% by weight of $Z_3$ and from 0.1 to 10% by weight of $Z_4$.

There is no restriction in principle on the polymers $Z_1$, but thermoplastically processable polymers are preferred. The preferred polymers include biodegradable polymers. These include polymers of very different structures, and also mixtures of different biodegradable polymers.

Polymeric reaction products of lactic acid may be used as biodegradable polymers in the novel process. These are known per se or may be prepared by processes known per se. Besides polylactide, use may also be made of those copolymers or block copolymers based on lactic acid with other monomers. Linear polylactides are mostly used. However, branched lactic acid polymers may also be used. Examples of branching agents are polyfunctional acids or alcohols. Polylactides which may be mentioned as an example are those obtainable essentially from lactic acid or from its $C_1$–$C_4$-alkyl esters or mixtures of these, with at least one aliphatic $C_4$–$C_{10}$ dicarboxylic acid and with at least one $C_3$–$C_{10}$ alkanol having from three to five hydroxyl groups.

Other examples of biodegradable polymers are aliphatic polyesters. These include homopolymers of aliphatic hydroxycarboxylic acids or lactones, and also copolymers or block copolymers of different hydroxycarboxylic acids or lactones or mixtures of these. These aliphatic polyesters may also contain units of diols and/or of isocyanates. The aliphatic polyesters may also contain units which derive from tri- or polyfunctional compounds, for example from epoxides, from acids or from triols. The aliphatic polyesters may contain the latter units as individual units, or a number of these, possibly together with the diols and/or isocyanates.

Processes for preparing aliphatic polyesters are known to the skilled worker. The aliphatic polyesters generally have molar asses (number-average) of from 10,000 to 100,000 g/mol.

Particularly preferred aliphatic polyesters include polycaprolactone.

Particularly preferred aliphatic polyesters are poly-3-hydroxybutanoates and copolymers of 3-hydroxybutanoic acid or mixtures thereof with 4-hydroxybutanoic acid and with 3-hydroxyvaleric acid, in particular with a proportion by weight of up to 30%, preferably up to 20%, of the last-named acid. Suitable polymers of this type also include those with R-stereospecific configuration, for example those disclosed in WO 96/09402. Polyhydroxybutanoates or copolymers of these can be prepared microbially. Processes for the preparation from various bacteria and fungi may be found in Nachr. Chem Tech. Lab. 39, 1112–1124 (1991), for example, and a process for preparing stereospecific polymers is known from WO 96/09402.

It is also possible to use block copolymers of the abovementioned hydroxycarboxylic acids or lactones, or of their mixtures, oligomers or polymers.

Other aliphatic polyesters are those built up from aliphatic or cycloaliphatic dicarboxylic acids or from mixtures of these, and from aliphatic or cycloaliphatic diols, or from mixtures of these. According to the invention either random or block copolymers may be used.

Suitable aliphatic dicarboxylic acids according to the invention generally have from 2 to 10 carbon atoms, preferably from 4 to 6 carbon atoms. They may be either linear or branched. For the purposes of the present invention, cycloaliphatic dicarboxylic acids which may be used are generally those having from 7 to 10 carbon atoms, and in particular those having 8 carbon atoms. However, in principle use may also be made of dicarboxylic acids having a larger number of carbon atoms, for example having up to 30 carbon atoms.

Examples which should be mentioned are: malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid and 2,5-norbornanedicarboxylic acid, preferably adipic acid.

Mention should also be made of ester-forming derivatives of the abovementioned aliphatic or cycloaliphatic dicarboxylic acids, which may likewise be used, in particular the di-$C_1$–$C_6$-alkyl esters, such as dimethyl, diethyl, di-n-propyl, diisopropyl, di-n-butyl, diisobutyl, di-tert-butyl, di-n-pentyl, diisopentyl and di-n-hexyl esters. Anhydrides of the dicarboxylic acids may likewise be used.

The dicarboxylic acids or ester-forming derivatives of these may be used individually or as a mixture of two or more of these.

Examples of aliphatic polyesters which may be used are aliphatic copolyesters as described in WO 94/14870, in particular aliphatic copolyesters made from succinic acid, from its diesters, or from mixtures with other aliphatic acids or, respectively, diesters, for example glutaric acid and butanediol, or mixtures made from this diol with ethylene glycol, propanediol or hexanediol or mixtures of these.

Aliphatic polyesters of this type generally have molar masses (number-average) of from 10,000 to 100,000 g/mol.

The aliphatic polyesters may also be random or block copolyesters which contain other monomers. The proportion of the other monomers is generally up to 10% by weight. Preferred comonomers are hydroxycarboxylic acids or lactones or mixtures of these.

In preparing the aliphatic polyesters it is, of course, also possible to use mixtures made from two or more comonomers and/or from other units, for example from epoxides or from polyfunctional aliphatic or aromatic acids, or from polyfunctional alcohols.

The polymer compositions may also be based on semiaromatic polyesters. For the purposes of the present invention, these include polyester derivatives, such as polyetheresters, polyesteramides and polyetheresteramides. Suitable biodegradable semiaromatic polyesters include linear non-chain-extended polyesters (WO 92/09654). Preference is given to chain-extended and/or branched semiaromatic polyesters. The latter are known from the publications mentioned at the outset, WO 96/15173 to 15176, 21689 to 21692, 25446, 25448 or WO 98/12242, which are expressly incorporated herein by way of reference. Mixtures of different semiaromatic polyesters may also be used, as may blends of semiaromatic polyesters with polylactide.

Preferred semiaromatic polyesters include polyesters which contain, as substantive components A) an acid component made from
   a1) from 30 to 95 mol % of at least one aliphatic or at least one cycloaliphatic dicarboxylic acid or ester-forming derivatives thereof or a mixture of these,
   a2) from 5 to 70 mol % of at least one aromatic dicarboxylic acid or an ester-forming derivative thereof or a mixture of these, and
   a3) from 0 to 5 mol % of a compound containing sulfonate groups, and
B) at least one diol component selected from the group consisting of $C_2$–$C_{12}$ alkanediols or of $C_5$–$C_{10}$ cycloalkanediols or of mixtures of these, and, if desired, also one or more components selected from the group consisting of
C) a component selected from the group consisting of
   c1) at least one dihydroxy compound containing ether functions and having the formula I $$HO-[(CH_2)_n-O]_m-H \qquad (I)$$

where n is 2, 3 or 4 and m is an integer from 2 to 250,
   c2) at least one hydroxycarboxylic acid of formula IIa or IIb

 (IIa)

 (IIb)

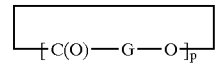

where p is an integer from 1 to 1500 and r is an integer from 1 to 4, and G is a radical selected from the group consisting of phenylene, —$(CH_2)_q$—, where q is an integer from 1 to 5, —C(R)H— and —C(R)HCH$_2$, where R is methyl or ethyl,
   c3) at least one amino-$C_2$–$C_{12}$ alkanol or ate least one amino-$C_5$–$C_{10}$ cycloalkanol, or a mixture of these, c4) at least one diamino-$C_1$–$C_8$ alkane,
c5) at least one 2,2'-bisoxazoline of the formula III

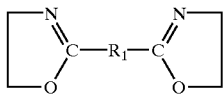 (III)

where $R^1$ is a single bond, $(CH_2)_z$ alkylene, where z=2, 3 or 4, or phenylene, and c6) at least one aminocarboxylic acid selected from the group consisting of the naturally occuring amino acids, polyamides with a molar mass of not more than 18,000 g/mol obtainable by polycondensing a dicarboxylic acid having from 4 to 6 carbon atoms with a diamine having from 4 to 10 carbon atoms, compounds of the formulae IVa and IVb

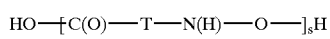 (IVa)

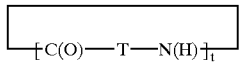 (IVb)

where s is an integer from 1 to 1500 and t is an integer from 1 to 4, and T is a radical selected from the group consisting of phenylene, —$(CH_2)_n$—, where n is an integer from 1 to 12, —$C(R^2)H$— and —$C(R^2)HCH_2$—, where $R^2$ is methyl or ethyl,
and polyoxazolines having the repeat unit V

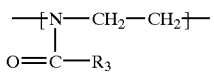 (V)

where $R^3$ is hydrogen, $C_1$–$C_6$-alkyl, $C_5$–$C_8$-cycloalkyl, phenyl, either unsubstituted or with up to three $C_1$–$C_4$-alkyl substituents, or tetrahydrofuryl, or a mixture made from c1 to c6 and from D) a component selected from the group consisting of
   d1) at least one compound having at least three groups capable of ester formation,
   d2) at least one isocyanate, and
   d3) at least one divinyl ether,
   or a mixture made from d1) to d3).

The acid component A in the preferred semiaromatic polyester comprises from 30 to 70 mol %, in particular from 40 to 60 mol %, of a1 and from 30 to 70 mol %, in particular from 40 to 60 mol %, of a2.

The aliphatic and, respectively, cycloaliphatic acids or corresponding derivatives used a1 may be those mentioned above. Particular preference is given to the use of adipic acid or sebacic acid, or ester-forming derivatives of each of these, or mixtures thereof. It is particularly preferable to use adipic acid or its ester-forming derivatives, for example its alkyl esters or mixtures of these.

Aromatic dicarboxylic acids a2 are generally those having from 8 to 12 carbon atoms, preferably 8 carbon atoms, for example terephthalic acid, isophthalic acid, 2,6-naphthoic acid and 1,5-naphthoic acid, and also ester-forming derivatives thereof. Particular examples here are the di-$C_1$–$C_6$-alkyl esters, e.g. dimethyl, diethyl, di-n-propyl, diisopropyl, di-n-butyl, diisobutyl, di-tert-butyl, di-n-pentyl, diisopentyl or di-n-hexyl esters. The anhydrides of the dicarboxylic acids a2 are also suitable ester-forming derivatives.

However, it is in principle also possible to use aromatic dicarboxylic acids a2 having a larger number of carbon atoms, for example up to 20 carbon atoms.

The aromatic dicarboxylic acids or ester-forming derivatives of these a2 may be used individually or as a mixture of two or more of these. It is particularly preferable to use terephthalic acid or its ester-forming derivatives, such as dimethyl terephthalate.

The compound used containing sulfonate groups is usually the alkali metal or alkaline earth metal salt of a sulfonate-containing dicarboxylic acid or ester-forming derivatives thereof, preferably alkali metal salts of 5-sulfoisophthalic acid or mixtures of these, particularly preferably the sodium salt.

In one of the preferred embodiments, the acid component A comprises from 40 to 60 mol % of a1, from 40 to 60 mol % of a2 and from 0 to 2 mol % of a3. In another preferred embodiment, the acid component A comprises from 40 to 59.9 mol % of a1, from 40 to 59.9 mol % of a2 and from 0.1 to 1 mol % of a3, in particular from 40 to 59.8 mol % of a1, from 40 to 59.8 mol % of a2 and from 0.2 to 0.5 mol % of a3.

The diols B are generally selected from the group consisting of branched or linear alkanediols having from 2 to 12 carbon atoms, preferably from 4 to 6 carbon atoms, or from the group consisting of cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanediol, 2,4-dimethyl-2-ethyl-1,3-hexanediol, 2,2-dimethyl-1,3-propanediol, 2-ethyl-2-butyl-1,3-propanediol, 2-ethyl-2-isobutyl-1,3-propanediol and 2,2,4-trimethyl-1,6-hexanediol, in particular ethylene glycol, 1,3-propanediol, 1,4-butanediol or 2,2-dimethyl-1,3-propanediol (neopentyl glycol); cyclopentanediol, 1,4-cyclohexanediol, 1,2-cyclohexanedimethanol, 1,3-cyclohexanedimethanol, 1,4-cyclohexanedimethanol or 2,2,4,4-tetramethyl-1,3-cyclobutanediol. It is also possible to use mixtures of different alkanediols.

Depending on whether an excess of acid groups or of OH end groups is desired, either component A or component B may be used in excess. In one preferred embodiment, the molar ratio of the components A and B used is from 0.4:1 to 1.5:1 preferably from 0.6:1 to 1.1:1.

Besides components A and B, the polyesters on which the films or coatings are based and which may be used in the novel process may contain other components.

Dihydroxy compounds c1 which are preferably used are diethylene glycol, triethylene glycol, polyethylene glycol, polypropylene glycol and polytetrahydrofuran (polyTHF), particularly preferably diethylene glycol, triethylene glycol and polyethylene glycol, and mixtures of these may also be used, as may compounds which have different variables n (see formula I), for example polyethylene glycol which contains propylene units (n=3), obtainable, for example, by using methods of polymerization known per se and polymerizing first with ethylene oxide and then with propylene oxide, and particularly preferably a polymer based on polyethylene glycol with different variables n, where units formed from ethylene oxide predominate. The molar mass ($M_n$) of the polyethylene glycol is generally selected within the range from 250 to 8000 g/mol, preferably from 600 to 3000 g/mol.

For preparing the semiaromatic polyesters in one of the preferred embodiments use may be made, for example, of from 15 to 98 mol %, preferably from 60 to 99.5 mol %, of the diols B and from 0.2 to 85 mol %, preferably from 0.5 to 30 mol %, of the dihydroxy compounds c1, based on the molar amount of B and c1.

In one preferred embodiment, the hydroxycarboxylic acid c2) used is: glycolic acid, D-, L- or D,L-lactic acid, 6-hydroxyhexanoic acid, cyclic derivatives of these, such as glycolide (1,4-dioxane-2,5-dione), D- or L-dilactide (3,6-dimethyl-1,4-dioxane-2,5-dione), p-hydroxybenzoic acid, or else their oligomers and polymers, such as 3-polyhydroxybutyric acid, polyhydroxyvaleric acid, polylactide (for example in the form of EcOPLA® (Cargill)), or else a mixture of 3-polyhydroxybutyric acid and polyhydroxyvaleric acid (the latter being obtainable as Biopol® from Zeneca) and for preparing semiaromatic polyesters particularly preferably the low-molecular-weight and cyclic derivatives thereof.

Examples of amounts which may be used of the hydroxycarboxylic acids are from 0.01 to 50% by weight, preferably from 0.1 to 40% by weight, based on the amount of A and B.

The amino-$C_2$–$C_{12}$ alkanol or amino-$C_5$–$C_{10}$ cycloalkanol used (component c3) which for the purposes of the present invention also include 4-aminomethylcyclohexanemethanol, are preferably amino-$C_2$–$C_6$ alkanols, such as 2-aminoethanol, 3-aminopropanol, 4-aminobutanol, 5-aminopentanol or 6-aminohexanol, or else amino-$C_5$–$C_6$ cycloalkanols, such as aminocyclopentanol and aminocyclohexanol, or mixtures of these.

The diamino-$C_1$–$C_8$ alkanes (component c4) used are preferably diamino-$C_4$–$C_6$ alkanes, such as 1,4-diaminobutane, 1,5-diaminopentane or 1,6-diaminohexane (hexamethylenediamine, HMD).

For preparing the semiaromatic polyesters in one preferred embodiment, use may be made of from 0.5 to 99.5 mol %, preferably from 70 to 98.0 mol %, of the diol component B, from 0.5 to 99.5 mol %, preferably from 0.5 to 50 mol %, of c3 and from 0 to 50 mol %, preferably from 0 to 35 mol %, of c4, based on the molar amount of B, c3 and c4.

The 2,2'-bisoxazolines c5 of the formula III are generally obtainable via the process of Angew. Chem. Int. Edit., Vol. 11 (1972), pp. 287–288. Particularly preferred bisoxazolines are those where $R^1$ is a single bond, $(CH_2)_q$ alkylene, where q=2, 3 or 4, for example methylene, ethane-1,2-diyl, propane-1,3-diyl or propane-1,2-diyl, or a phenylene group. Particularly preferred bisoxazolines which may be mentioned are 2,2'-bis(2-oxazoline), bis(2-oxazolinyl)methane, 1,2-bis(2-oxazolinyl)ethane, 1,3-bis(2-oxazolinyl)propane and 1,4-bis(2-oxazolinyl)butane, in particular 1,4-bis(2-oxazolinyl)benzene, 1,2-bis(2-oxazolinyl)benzene or 1,3-bis(2-oxazolinyl)benzene.

In preparing the semiaromatic polyesters use may, for example, be made of from 70 to 98 mol % of B1, up to 30 mol % of c3 and from 0.5 to 30 mol % of c4 and from 0.5 to 30 mol % of c5, based in each case on the total of the molar amounts of components B1, c3, c4 and c5. In another preferred embodiment, use may be made of from 0.1 to 5% by weight, preferably from 0.2 to 4% by weight, of c5, based on the total weight of A and B.

The component c6 used may be naturally occurring aminocarboxylic acids. These include valine, leucine, isoleucine, threonine, methionine, phenylalanine, tryptophan, lysine, alanine, arginine, aspartamic acid, cysteine, glutamic acid, glycine, histidine, proline, serine, tyrosine, asparagin and glutamine.

Preferred aminocarboxylic acids of the formulae IVa and IVb are those where s is an integer from 1 to 1000 and t is an integer from 1 to 4, preferably 1 or 2, and T has been selected from the group consisting of phenylene and —$(CH_2)_n$—, where n is 1, 5 or 12.

c6 may also be a polyoxazoline of the formula V. However, c6 may also be a mixture of different aminocarboxylic acids and/or polyoxazolines.

In one preferred embodiment, the amount of c6 used is from 0.01 to 50% by weight, preferably from 0.1 to 40% by weight, based on the total amount of components A and B.

Other components which may be used, if desired, for preparing the semiaromatic polyesters include compounds d1 which contain at least three groups capable of ester formation.

The compounds d1 preferably contain from three to ten functional groups which are capable of developing ester bonds. Particularly preferred compounds d1 have from three to six functional groups of this type in the molecule, in particular from three to six hydroxyl groups and/or carboxyl groups. Examples which should be mentioned are:
tartaric acid, citric acid, maleic acid;
trimethylolpropane, trimethylolethane;
pentaerythritol;
polyethertriols;
glycerol;
trimesic acid;
trimellitic acid, trimellitic anhydride;
pyromellitic acid, pyromellitic dianhydride, and
hydroxyisophthalic acid.

The amounts generally used of the compounds d1 are from 0.01 to 5 mol %, preferably from 0.05 to 4 mol %, based on component A.

Components d2 used are an isocyanate or a mixture of different isocyanates. For example, aromatic or aliphatic diisocyanates may be used. However, higher-functionality isocyanates may also be used.

For the purposes of the present invention, aromatic diisocyanate d2 is especially tolylene 2,4-diisocyanate, tolylene 2,6-diisocyanate, diphenylmethane 2,2'-diisocyanate, diphenylmethane 2,4'-diisocyanate, diphenylmethane 4,4'-diisocyanate, naphthylene 1,5-diisocyanate or xylylene diisocyanate.

Among these, particular preference is given to diphenylmethane diisocyanates are generally used as a mixture.

A three-ring isocyanate d2 which may also be used is tri(4-isocyanophenyl)methane. Multi-ringed aromatic diisocyanates arise during the preparation of single- or two-ring diisocyanates, for example.

Component d2 may also contain subordinate amounts, e.g. up to 5% by weight, based on the total weight of component d2, of urethione groups, for example for capping the isocyanate groups.

Preferred isocyanurates include aliphatic isocyanurates, such as isocyanurates which derive from alkylene diisocyanates or cycloalkylene diisocyanates having from 2 to 20 carbon atoms, preferably from 3 to 12 carbon atoms, e.g. isophorone diisocyanate. The alkylene diisocyanates here may be either linear or branched. Particular preference is given to diisocyanurates based on n-hexamethylene diisocyanate.

The amounts generally used of component d2 are from 0.01 to 5 mol %, preferably from 0.05 to 4 mol %, based on the total of the molar amounts of A and B.

Divinyl ethers d3 which may be used are generally any of the 40 customary and commercially available divinyl ethers. Preference is given to the use of 1,4-butanediol divinyl ethers, 1,6-hexanediol divinyl ethers or 1,4-cyclohexanedimethanol divinyl ethers or a mixture of these.

The amounts of the divinyl ethers preferably used are from 0.01 to 5% by weight, preferably from 0.2 to 4% by weight, based on the total weight of A and B.

Examples of preferred semiaromatic polyesters are based on the following components
A, B, d1
A, B, d2
A, B, d1, d2
A, B, d3
A, B, c1
A, B, c1, d3
A, B, c3, c4
A, B, c3, c4, c5
A, B, d1, c3, c5
A, B, c3, d3
A, B, c3, d1
A, B, c1, c3, d3
A, B, c2

Among these, particular preference is given to semiaromatic polyesters based on A, B and d1, or A, B and d2, or A, B, d1 and d2. In another preferred embodiment, the semiaromatic polyesters are based on A, B, c3, c4 and c5 or A, B, d1, c3 and c5.

The preparation of the semiaromatic polyesters is known per se or can take place by methods known per se, e.g. by those given in WO 96/15173.

The preferred semiaromatic polyesters are characterized by a molar mass Mn of from 5000 to 50,000 g/mol, in particular from 10,000 to 40,000 g/mol, with a viscosity number of from 50 to 400 ml/g, in particular from 100 to 300 ml/g (measured in o-dichlorobenzene/phenol; weight ratio 50/50, at a concentration of 0.5% by weight of polymer, at 25° C.) and with a melting point of from 60 to 170° C., preferably from 80 to 150° C.

According to the invention, the polymers which are used as component $Z_1$ in the compositions Z are compatible with the polymers Q1 which are the basis for the polymer compositions Q. Two polymer components are generally understood to be compatible if the components are miscible or one polymer has a tendency to dissolve in the other polymer component (see B. Vollmert, Grundriβ der makromolekulen Chemie, Vol. IV, pp. 222 et seq., E. Vollmert Verlag 1979). One way of determining compatibility is to use their difference in solubility parameters, optical clarity or glass transition temperature, or to use a spectroscopic method, e.g. NMR, IR or fluorescence measurements, or else to use haze measurements or scattering methods (see L. A. Utracki "Polymer Alloys and Blends" pp. 34–42, New York 1989, for example).

It is preferable for the polymers $Z_1$ used to be the same as those used in the polymer composition Q. The polymer composition Q may be based on a polymer Q1 or on a mixture of different polymers Q1. The polymers Q1 are preferably those mentioned for $Z_1$.

The origin and composition of the starch used in the novel process may vary very widely. Examples of materials included in the term starch here are polysaccharides of natural or vegetable origin, built up primarily from amylose and/or from amylopectin. Starch may be obtained from various plants, for example, such as potatoes, rice, tapioca, corn, peas or cereals, such as wheat, oats or rye. Preference is given to starches which are prepared from potatoes, corn, wheat or rice. It is also possible to use mixtures of starches of differing origin. Particularly preferred starches include potato starch. However, it is also possible to use thermoplastically processable starches. These include starches which have side chains, e.g. those bonded to the starch via ether groups or via ester groups.

It is particularly preferable to use pulverulent starch. Examples of suitable powders are those with bulk densities of from 300 to 900 kg/m³. Preferred powders have bulk densities of from 600 to 800 kg/m³. The powder generally comprises from 2 to 20% by weight of water, based on the powder.

The cellulose used may be of widely varying origin. For example, use may be made of cellulose from sources, such as cotton, which comprise no lignin or from sources, such as wood, which comprise lignin, in which case the cellulose used, e.g. wood cellulose, should have been substantially freed from lignin.

Modified celluloses may also be used in the novel process. For the purposes of the present invention, these are cellulose esters or cellulose ethers. Among these, preference is given to those with a degree of substitution of up to 2.5. Preferred substituent radicals are alkanoyl having from 2 to 10 carbon atoms. Examples of preferred cellulose esters are cellulose acetates, cellulose propionates, cellulose butyrates, cellulose acetate propionates and cellulose acetate butyrates.

It is preferable to use cellulose in the form of fine fibers. The fibers generally comprise small amounts of water, typically from 2 to 12% by weight, preferably from 2 to 5% by weight, based on the fibers.

In the novel process it is also possible to use a mixture of different starches or of different celluloses, or mixtures of one or more starches and one or more celluloses.

The compositions z comprise, as component $Z_3$, beeswax or montan ester wax. According to the invention, component $Z_3$ may also be a mixture of beeswax and montan ester wax. In one preferred embodiment, $Z_3$ is beeswax. The beeswax may comprise small amounts of other waxes as contamination. However, the beeswax used as $Z_3$ is preferably substantially free from other waxes. The beeswaxes used as $Z_3$ may be of varying provenance and therefore of varying composition. Montan ester waxes of varying compositions may likewise be used. The beeswaxes and, respectively, montan ester waxes typically have a drop point of from 60 to 85° C., preferably from 60 to 65° C., an acid number of from 15 to 22 and a saponification value of from 85 to 158, preferably from 85 to 105. The beeswax may be used in varying forms, for example as a melt or as particles. The beeswax is generally in the form of pastilles when used in the novel process.

The composition Z may be prepared by mixing and/or homogenizing the constituents, preferably within a temperature range in which the polymers $Z_1$ are molten, e.g. at from 220 to 260° C., in mixing equipment of any type, e.g. kneaders, such as Haake kneaders, mixers, such as tumbling mixers or Banbury mixers, or extruders, such as single-screw extruders, and preferably twin-screw extruders. The sequence of adding the components may be varied, and two components may be premixed, or else all three of the components mixed together. It is generally preferable for polymer component $Z_1$ to be an initial charge and for this to be melted and then for the compatibilizer $Z_2$ and the beeswax $Z_3$ to be added. It is particularly preferable here to add a mixture of $Z_2$ and $Z_3$.

The compositions may moreover also comprise additives $Z_4$, such as fatty amides, in particular erucamide, mono-, di- or triglycerides of fatty acids, in particular glycerol monostearate or glycerol tristearate, talc, neutralizers, stabilizers or colorants, and examples of stabilizers which may be used are tocopherol (vitamin E), organic phosphorus compounds, mono-, di- or polyphenols, hydroquinones, diarylamines or thio ethers. Examples of colorants which may be added are UV stabilizers, pigments, carbon black or fluorescent dyes. Among the fluorescent dyes, particular preference is given to optical brighteners which are free from ionic groups and derived from the class of bisstyrylbenzenes, stilbenes, benzoxyzoles, coumarins or pyrenes, in particular from the class of cyanostyryl compounds. In a preferred embodiment the compositions Z contain glycerol monostearate as additive $Z_4$. The sequence of addition of these other additives may be varied, for example, the additives may be premixed with one of the components of Z. However, they may also be to some extent premixed or to some extent or entirely introduced later.

The compositions Z may be added to the polymer compositions Q or vice versa as a premix (masterbatch), in the amounts needed to achieve the desired final concentration of beeswax and of any other additives present. The polymer compositions Q here may themselves comprise additives, such as the above-mentioned stabilizers or dyes, or else fillers or reinforcing materials, or these may be added to the compositions Q after addition of Z. In biodegradable polymer compositions, fillers or reinforcing materials which may be present in Q or else may be added to these compositions after addition of Z are starch or cellulose, such as cellulose fibers, sisal or hemp. Examples of other suitable additives are calcium carbonate, calcium sulfate and talc as nucleating agent.

In one of the preferred embodiments, the polymer compositions Q prepared by the novel process comprise from 0.1 to 2% by weight, preferably from 0.1 to 1% by weight, of beeswax or montan ester wax or mixtures of these, based on the total weight of the polymer compositions, and also from 0.1 to 50% by weight, preferably from 1 to 20% by weight, of additives, such as fillers, reinforcing materials or other additives or mixtures of these.

An advantage of the novel process is that it gives films or coatings with reduced water permeability. In addition, the film surfaces have a pleasant feel. Another advantage of the novel process is that the conveying rate of the polymer compositions, i.e. the throughput per rotation per minute of the extruder screw, is from 5 to 15% higher, for example, than for polymer compositions which were not prepared by the novel process.

EXAMPLES

Test Methods:

The melt volume index (MVI) [$cm^3/10'$] was determined to DIN 53735 or ISO 1133 at 190° C. with a load of 2.16 kg.

Tear strength [$N/mm^2$] (in each case parallel and perpendicular) was measured using S3A stamped-out dumb bell-shaped test specimens to DIN 53504. (50 mm length, 8.5 mm maximum width in the upper region and 4 mm test width). The distance between the clamps was 25 mm at the start of the test, and the pull rate for the specimens was 100 mm/min.

The water vapor permeability WVP [$g \cdot 100\ \mu m \cdot m^{-2} \cdot d^{-1}$] was measured using a carrier-gas method to ASTM F 1249 (test apparatus: Mocon Permatran W 600). In this method, water vapor molecules diffusing through the film are conveyed by a carrier gas (dry nitrogen) to an infrared detector which quantifies the flow of water vapor. The flow of water vapor is used to determine the water vapor permeability based on a thickness of 100 $\mu m$.

The drop point [° C.] was determined by the Ubbelohde method to DIN 51801.

The acid number [mg KOH/g] was measured to DIN 53402.

The saponification value [mg KOH/g] was measured to DIN 53401.

Materials:

The polymers $Z_{11}$ to $Z_{13}$ used were polyesters built up from 1,4-butanediol, adipic acid and terephthalic acid (molar ratio: 100:45:55) and from 0.1% by weight, based on the total weight of all of the monomers used, of glycerol and from 0.5% by weight, based on the total weight of all of the monomers used, of hexamethylene diisocyanate, and characterized by a melt volume index (MVI) of $Z_{11}$: 5 $cm^3/10'$, $Z_{12}$: 7 $cm^3/10'$ and $Z_{13}$: 15 $cm^3/10'$.

Polymer $Z_{11}$ was used as polymer $Q1_1$.

The compatibilizer used was pulverulent potato starch (white) ($Z_{21}$) or cellulose in the form of fine fibers ($Z_{22}$) (microfibers with a cellulose content of 99.5% and a screen residue >71 $\mu m$: 0.1%, >32 $\mu m$: 3%). For comparison, polycaprolactone at a MVI of 25 $cm^3/10'$ ($Zcomp_{21}$) and, respectively, pulverulent talc ($Zcomp_{22}$) were used.

Component $Z_{31}$ used was beeswax in the form of pastilles. The beeswax had a drop point of 63° C., an acid number of 19.3, an ester number of 75.3 and a saponification value of 94.6.

Preparation of Compositions Z

Examples 1 to 5

The polyester was annealed at 150° C. for ten minutes in a Haake kneader and the resultant torque determined. The wax mixed with compatibilizer was then added and the resultant torque determined after 3 minutes. The torque here is a measure of the incorporation of the wax into the polymer matrix. A fall-off in the torque is attributable to external lubrication by the wax. The results are found in Table 1.

Comparative Experiments 1comp and 2comp

The experiments described in 1 to 5 were repeated, but carried out without compatibilizer. The resultant pellets felt waxy. The cooling water comprised relatively large amounts of wax.

TABLE 1

Preparation of compositions Z

| | Compatibilizer | | Wax | Torque Polyester | |
|---|---|---|---|---|---|
| Ex. No. | Type | Amount [% by weight] | [% by weight] | prior to addition | After addition |
| 1comp | — | — | 5 | 640 | 5 |
| 2comp | — | — | 10 | 620 | 5 |
| 1 | $Z_{21}$ | 5 | 10 | 600 | 520 |
| 2 | $Z_{21}$ | 10 | 15 | 770 | 440 |
| 3 | $Z_{22}$ | 5 | 5 | 670 | 590 |
| 4 | $Z_{22}$ | 10 | 10 | 680 | 450 |
| 5 | $Z_{22}$ | 15 | 15 | 670 | 390 |

Examples 6 to 13

The compatibilizer $Z_{21}$ and, respectively, $Z_{22}$ was premixed with the beeswax $Z_{31}$ at 80° C. and added to the polyester $Z_{11}$ and, respectively, $Z_{12}$. Processing took place in an extruder (Werner & Pfleider ZSK twin-screw extruder) under the conditions given in Table 2. The composition was then water-bath cooled and pelletized.

Comparative Experiments 3comp to 7comp

The beeswax $Z_{31}$ was mixed with the polyesters $Z_{11}$ and, respectively, $Z_{13}$ under the conditions given in Table 3, in an extruder (Werner & Pfleider ZSK twin-screw extruder). The compositions were then water-bath cooled and pelletized.

Comparative Experiments 8comp to 11comp

Experiments 6 to 13 were repeated, but polycaprolactone $Zcomp_{21}$ and, respectively, talc $Zcomp_{22}$ were used instead of the compatibilizer $Z_{21}$ and, respectively, $Z_{22}$. The experimental conditions and results are found in Table 3.

TABLE 2

Preparation of novel compositions Z

|  | 6 | 7 | 8 | 9 | 10 | 11 | 12 | 13 | 14 |
|---|---|---|---|---|---|---|---|---|---|
| Composition: | | | | | | | | | |
| Polyester | $Z_{11}$ | $Z_{11}$ | $Z_{11}$ | $Z_{11}$ | $Z_{12}$ | $Z_{12}$ | $Z_{12}$ | $Z_{12}$ | |
| $Z_{21}$ [%] | 5 | 10 | — | — | 2.5 | 5 | 10 | 20 | 1 |
| $Z_{22}$ [%] | — | — | 5 | 10 | — | — | — | — | |
| $Zcomp_{21}$ [%] | — | — | — | — | — | — | — | — | |
| $Zcomp_{22}$ [%] | — | — | — | — | — | — | — | — | |
| $Z_{31}$ [%] | 10 | 10 | 10 | 10 | 10 | 10 | 10 | 10 | 5 |
| Conditions: | | | | | | | | | |
| Extruder ZSK | 30 | 30 | 30 | 30 | 30 | 30 | 30 | 30 | |
| Processing temperature [° C.] | 130 | 130 | 130 | 130 | 130 | 130 | 130 | 130 | |
| Rotation rate [rpm] | 200 | 200 | 200 | 200 | 200 | 200 | 200 | 200 | |
| Throughput [kg/h] | 10 | 10 | 10 | 10 | 5 | 5 | 5 | 5 | |
| Remark | c | c | c | c | c | c | c | c | | a) wax in water bath
b) pellet surface very waxy
c) neither a) nor b)

TABLE 3

Preparation of compositions for comparison

|  | 3 comp | 4 comp | 5 comp | 6 comp | 7 comp | 8 comp | 9 comp | 10 comp | 11 comp |
|---|---|---|---|---|---|---|---|---|---|
| Composition | | | | | | | | | |
| Polyester | $Z_{11}$ | $Z_{11}$ | $Z_{13}$ | $Z_{11}$ | $Z_{11}$ | $Z_{11}$ | $Z_{11}$ | $Z_{11}$ | $Z_{11}$ |
| $Z_{21}$ [%] | — | — | — | — | — | — | — | — | — |
| $Z_{22}$ [%] | — | — | — | — | — | — | — | — | — |
| $Zcomp_{21}$ [%] | — | — | — | — | — | 5 | 10 | — | — |
| $Zcomp_{22}$ [%] | — | — | — | — | — | — | — | 5 | 10 |
| $Z_{31}$ [%] | 5 | 5 | 5 | 5 | 11 | 10 | 10 | 10 | 10 |
| Conditions: | | | | | | | | | |
| Extruder ZSK | 25 | 40 | 40 | 30 | 30 | 30 | 30 | 30 | 30 |
| Processing temperature [° C.] | 130 | 130 | 130 | 130 | 130 | 130 | 130 | 130 | 130 |
| Rotation rate [rpm] | 100 | 100 | 100 | 400 | 400 | 200 | 200 | 200 | 200 |
| Throughput [kg/h] | 5 | 5 | 5 | 10 | 10 | 10 | 10 | 10 | 10 |
| Remark | a, b | a, b | a, b | a, b | a, b | a, b | a, b | a, b | a, b | a) wax in water bath
b) pellet surface very waxy
c) neither a) nor b)

Preparation of Polymer Compositions Q and Production of Films from These

Examples 15 to 19

The compositions of Examples 10 to 14 were processed in a Windmöller & Hölscher extruder with a screw diameter of 60 mm at about 160° C. with the polymer $Q1_1$, to give polymer compositions. Each of the polymer compositions of Examples 14 to 17 was mixed with 0.6% by weight of fine talc and 0.2% by weight of erucamide, based on the polymer composition. Polymer composition 18 was mixed with 0.2% by weight of erucamide, based on the polymer composition. The polymer compositions were used under the conditions given in Table 4 to produce blown films, which were cut to give flat films.

Comparative Example 12comp

Example 18 was repeated, but only polymer $Q1_1$ (with 0.2% by weight of erucamide) was used.

The novel films have good tear strength, even when compared with films free from beeswax. Even at a content of only 0.2% by weight of beeswax, the water-vapor permeability of the novel films was reduced by 55%.

Compared with 12comp, the conveying rate was raised by 9%.

TABLE 4

Preparation of polymer compositions and production of films

|  | 15 | 16 | 17 | 18 | 19 | 12 comp |
|---|---|---|---|---|---|---|
| Polymer composition: | | | | | | |
| Composition No. | 10 | 11 | 13 | 13 | 14 | — |
| Composition [% by weight] | 2 | 2 | 2 | 2 | 2 | 0 |
| $Q1_1$ [% by weight] | 98 | 98 | 98 | 98 | 98 | 100 |
| Film production: | | | | | | |
| Take-off speed [m/min] | 17.2 | 17.2 | 17.2 | 17.1 | 9.0 | 9.0 |
| Expansion performance | 3.6 | 3.6 | 3.6 | 3.6 | 3.0 | 3.0 |
| Slip | good | good | good | good | good | good |
| $\sigma_{II}$ [N/mm$^2$] | 33.2 | 32.7 | 29.9 | 29.1 | 28.5 | 33.1 |

TABLE 4-continued

Preparation of polymer compositions and production of films

|  | 15 | 16 | 17 | 18 | 19 | 12 comp |
|---|---|---|---|---|---|---|
| σ⊥ [N/mm²] | 40.9 | 39.6 | 35.7 | 31.4 | 33.1 | 37.5 |
| Film thickness [μm] | 20 | 20 | 21 | 20 | 47 | 49 |
| WVP [g · 100 μm · m⁻² · d⁻¹] | n.m. | n.m. | n.m. | n.m. | 35 | 78 |
| Feel | a | a | a | a | a | ??? | n.m.: not measured;
a: pleasant

We claim:
1. A process for reducing the water-vapor permeability of films or coatings made from polymer compositions (Q) comprising beeswax or comprising montan ester wax or comprising mixtures of these, which comprises in a first step preparing a composition (Z) comprising $Z_1$) from 40 to 98.5% by weight of at least one polymer compatible with the polymers (Q1) which are the basis of Q, $Z_2$) from 0.5 to 20% by weight of starch or cellulose or a mixture of these as compatibilizer, $Z_3$) from 1 to 20% by weight of beeswax or montan ester wax or a mixture of these, and $Z_4$) from 0 to 20% by weight of at least one additive, where the percentages by weight are based on the total weight of Z, and in a second step combining the composition Z with the polymer which is the basis of Q.

2. A process as claimed in claim 1, wherein Z is prepared by mixing $Z_2$ with $Z_3$ and combining this mixture with $Z_1$.

3. A process as claimed in claim 1 or 2, wherein use is made of from 1 to 15% by weight of the compatibilizer $Z_2$, based on the total weight of Z.

4. A composition comprising
   $Z_1$) from 40 to 98.5% by weight of at least one partly aromatic polyester,
   $Z_2$) from 0.5 to 20% by weight of starch or cellulose or a mixture of these,
   $Z_3$) from 1 to 20% by weight of beeswax or a montan ester wax or a mixture of these, and
   $Z_4$) from 0 to 25% by weight of at least one additive.

5. A composition as claimed in claim 4, where polyesters used as component $Z_1$ contain, as substantive components,
   A) an acid component made from
      a1) from 30 to 95 mol % of at least one aliphatic or at least one cycloaliphatic dicarboxylic acid or ester-forming derivatives thereof or a mixture of these,
      a2) from 5 to 70 mol % of at least one aromatic dicarboxylic acid or an ester-forming derivative thereof or a mixture of these, and
      a3) from 0 to 5 mol % of a compound containing sulfonate groups, and
   B) at least one diol component selected from the group consisting of $C_2$–$C_{12}$ alkanediols or of $C_5$–$C_{10}$ cycloalkanediols, or of mixtures of these,
and, if desired, also one or more components selected from the group consisting of
   C) a component selected from the group consisting of
      c1) at least one dihydroxy compound containing ether functions and having the formula I

where n is 2, 3 or 4 and m is an integer from 2 to 250, c2) at least one hydroxycarboxylic acid of formula IIa or IIb

where p is an integer from 1 to 1500 and r is an integer from 1 to 4, and G is a radical selected from the group consisting of phenylene, —(CH$_2$)$_q$—, where q is an integer from 1 to 5, —C(R)H— and —C(R)HCH$_2$—, where R is methyl or ethyl,
   c4) at least one diamino —C$_1$–C$_8$ alkane,
   c5) at least one 2,2'-bisoxazoline of the formula III

where $R^1$ is a single bond, (CH$_2$)$_z$ alkylene, where z=2, 3 or 4, or phenylene, and
   c6) at least one aminocarboxylic acid selected from the group consisting of the naturally occuring amino acids, polyamides with a molar mass of not more than 18,000 g/mol obtainable by polycondensing a dicarboxylic acid having from 4 to 6 carbon atoms with a diamine having from 4 to 10 carbon atoms, compounds of the fomulae IVa and IVb

where s is an integer from 1 to 1500 and t is an integer from 1 to 4, and T is a radical selected from the group consisting of phenylene, —(CH$_2$)$_n$—, where n is an integer from 1 to 12, —C(R$^2$)H— and —C(R$^2$)HCH$_2$—, where R$^2$ is methyl or ethyl,
and polyoxazolines having the repeat unit V

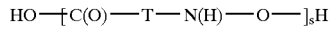

where $R^3$ is hydrogen, $C_1$–$C_6$-alkyl, $C_5$–$C_8$-cycloalkyl, phenyl, either unsubstituted or with up to three $C_1$–$C_4$-alkyl substituents, or tetrahydrofuryl, or a mixture made from c1 to c6, and of
D) a component selected from group consisting of
   d1) at least one compound having at least three groups capable of ester formation,
   d2) at least one isocyanate, and
   d3) at least one divinyl ether, or a mixture made from d1) to d3).

* * * * *

UNITED STATES PATENT AND TRADEMARK OFFICE
CERTIFICATE OF CORRECTION

PATENT NO. : 6,727,298 B2 Page 1 of 1
DATED : April 27, 2004
INVENTOR(S) : Witt et al.

It is certified that error appears in the above-identified patent and that said Letters Patent is hereby corrected as shown below:

Column 15,
Line 42, change "...from 0 to 25%..." to -- ...from 0 to 20%... --

Signed and Sealed this

Fifth Day of April, 2005

JON W. DUDAS
*Director of the United States Patent and Trademark Office*